(No Model.)
I. BLUFORD.
TWO WHEELED VEHICLE.
No. 357,972. Patented Feb. 15, 1887.
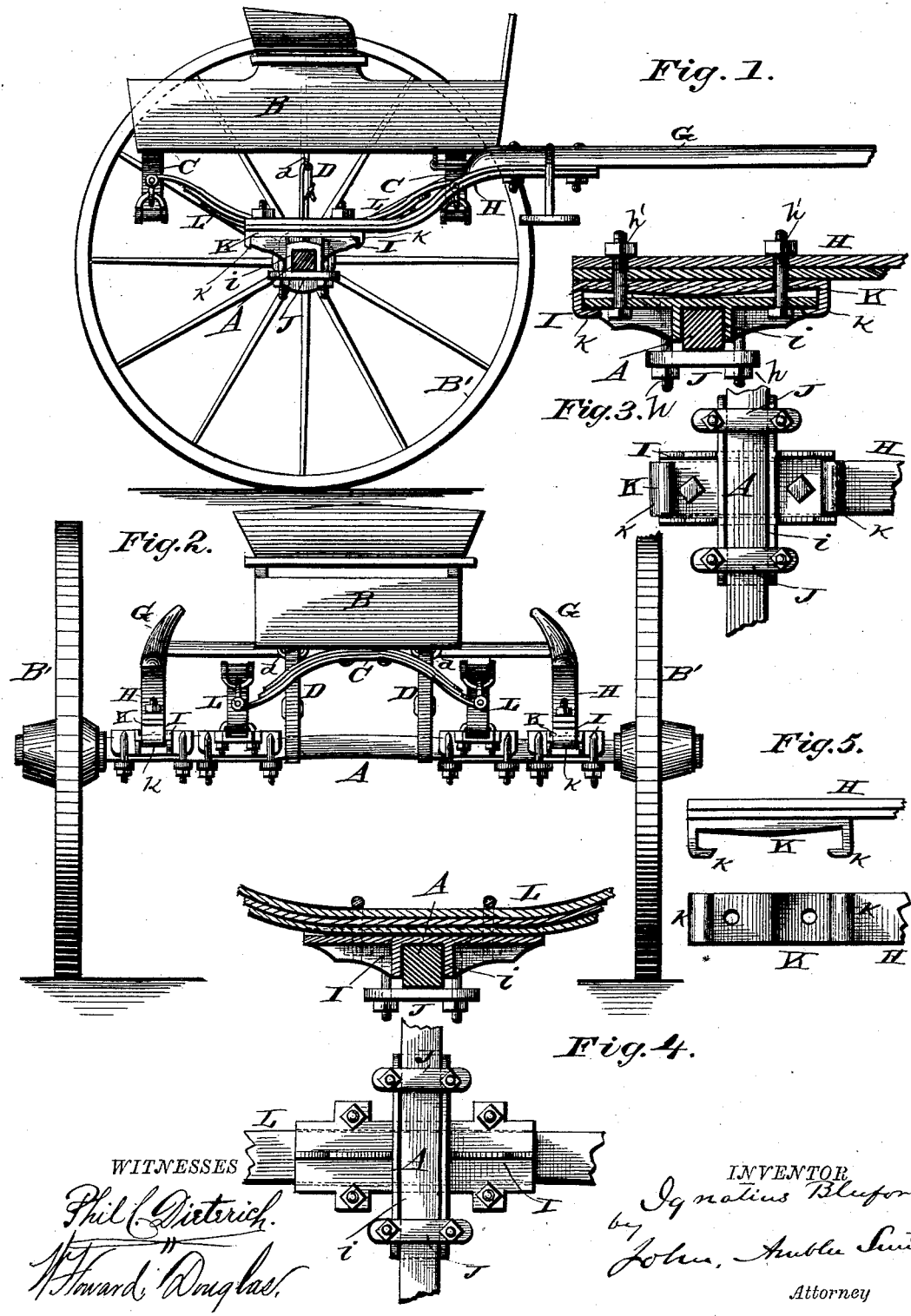
WITNESSES
Phil C. Dietrich.
Howard Douglas.
INVENTOR
Ignatius Bluford
by John Ambler Smith
Attorney

UNITED STATES PATENT OFFICE.

IGNATIUS BLUFORD, OF ELIZABETH CITY, NORTH CAROLINA.

TWO-WHEELED VEHICLE.

SPECIFICATION forming part of Letters Patent No. 357,972, dated February 15, 1887.

Application filed December 12, 1885. Serial No. 185,768. (No model.)

*To all whom it may concern:*

Be it known that I, IGNATIUS BLUFORD, a citizen of the United States, residing at Elizabeth City, in the county of Pasquotank and State of North Carolina, have invented certain new and useful Improvements in Carriage-Springs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in the shaft couplings and springs, and it has for its object to relieve the vehicle from "horse motion," which usually accompanies vehicles of the ordinary construction; and to this end the invention consists in the novel construction and arrangement of parts, as will be hereinafter more particularly described, and pointed out in the claim.

In the annexed drawings, to which reference is made, and which illustrate my invention, Figure 1 is a side elevation. Fig. 2 is a rear view of the same; and Figs. 3, 4, and 5 are detailed views of the shaft-springs, clips, and locking-bar.

A designates an axle, upon which the body B of the vehicle is mounted upon driving-wheels B' B' through the medium of springs C, said springs C being secured to the body in front and rear by any well-known means, and being located transversely to the line of draft of the vehicle.

D D are two check-straps, which are passed through check-loops d d, secured to the under side of the body B and to the center thereof, and which fasten the body and axle together by the ordinary buckle-fastenings, and which serve to keep the body steady and from jumping up when it meets with an obstruction and cause the breaking of the springs.

H H are two longitudinal shaft, pole, or horse-motion springs, their forward ends being connected to the rear part of a pole or shafts, G, by a bolt-and-nut connection, the rear end of said springs being located and secured upon the shaft clips or couplings I by a connection similar to the front end of said springs—*i. e.*, by a bolt-and-nut connection. These clips or couplings I are so constructed as to have a recess, *i*, therein, and which receives the axle A, and is clipped therein by means of clips J and bolt-and-nut connection, the clips J serving to form a bearing for the axle A.

Interposed between the springs H and coupling I is a locking-bar, K, said bar being riveted to the springs, the under side of which bar is V shape, (more particularly shown in Fig. 5 of the drawings,) the object of which is to adjust the shafts higher or lower, to suit any-sized animal, as the case may require. This locking-bar K has a further object, which is to secure the springs H to the bearing of the clips I. Two bolts, $h'$, pass through the clips I, the locking-bar, and the spring H, and thus additionally secure the spring. The locking-bar K will hold the clip in place, by reason of its lips or hooks $k$, in case the bolts $h'$ should be broken.

L L are side springs, which are connected to the front and rear transverse springs C by means of shackle or any suitable connection, and which is clearly shown in Figs. 1 and 2 of the drawings.

From the foregoing description it will be obvious that, the body of the vehicle being independent of the shafts, all horse motion is entirely avoided by the simple, convenient, and inexpensive connection of the shaft or pole springs, hereinbefore described.

Having thus described my invention, what I claim as new, and desire to secure by Letters Patent, is—

In a two-wheeled vehicle, the combination of the shaft-springs H, the clips or couplings I, provided with the recess $i$, the bolts $h'$, the locking-bar K, constructed as described and provided with the lips $k$, and the axle A, all constructed, arranged, and operating substantially as described.

In testimony whereof I affix my signature in presence of two witnesses.

IGNATIUS BLUFORD.

Witnesses:
J. C. LATHROP,
JNO. CRUIKSHANK.